March 20, 1956  J. SULGER  2,738,840
STAMPING AND SHEARING MACHINE TOOLS
Filed Oct. 25, 1951  4 Sheets-Sheet 1

Inventor:
Jakob Sulger
by
Young, Emery & Thompson
Attorneys

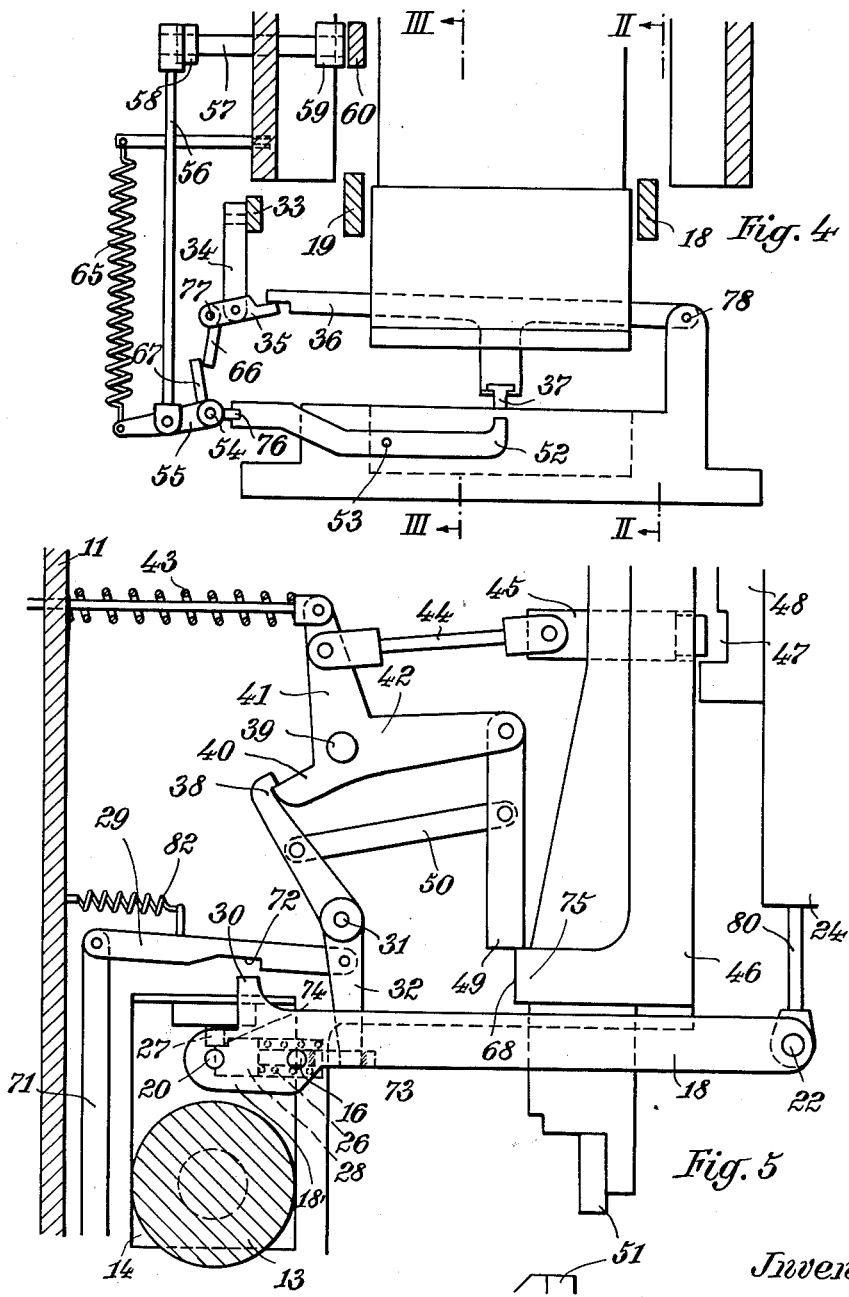

Inventor:
Jakob Sulger

March 20, 1956  J. SULGER  2,738,840
STAMPING AND SHEARING MACHINE TOOLS
Filed Oct. 25, 1951  4 Sheets-Sheet 4

Inventor
Jakob Sulger
By Young, Emery & Thompson
Attys.

United States Patent Office 2,738,840
Patented Mar. 20, 1956

2,738,840

STAMPING AND SHEARING MACHINE TOOLS

Jakob Sulger, Goppingen, Wurttemberg, Germany, assignor to L. Schuler A.-G., Goppingen, Wurttemberg, Germany Application October 25, 1951, Serial No. 253,051

8 Claims. (Cl. 164—12)

This invention relates to punching and embossing machines and similar machine tools having means for also cutting the beginning and the end of work strips, and comprising feed mechanism, for example, rolls, for feeding a band of strip material stepwise in entire stamping lengths, and shear mechanism such as a pair of shear blades arranged in front of the stamping tool.

It is an object of the present invention to solve the problem of automatically severing work strips of any desired length incidental to the punching operations in the machine in such a manner that no partial cuts can take place which might damage the punching tool.

The present invention provides a mechanical feeler means cooperating with the end of the strip and controlling the shear means in such a manner that the said means will effect the end cut after the last punching operation has been performed on the strip. The end cut is therefore effected not after a pre-set number of strokes of the tool ram, but is independent of the latter, so that the end of the strip material of any desired length can be cut automatically.

In a preferred constructional form the machine comprises a ram carrying an upper shear blade, means for vertically reciprocating said ram and blade, a punch ram, coupling means for connecting the shear ram with the punch ram, said coupling means comprising preferably a bolt slidably mounted in the shear ram under control of a spring, said bolt being engageable with a recess in the punch ram. By these means the shear ram can be coupled to the punch ram and driven thereby.

In a constructional example there is provided a mechanical feeler acted upon by a spring and locked in front of the shear blades, rod and lever mechanism connecting the feeler with members which are disengaged by the coupling spring in such a manner that the feeler can be advanced into the path of feed of the strip after its traverse by the strip end, and will then release the said spring to produce engagement of the coupling bolt.

Preferably the members disengaged by the coupling spring comprise a three-armed lever jointed to the coupling bolt and a pawl cooperating with said lever and operating to hold the bolt in withdrawn position. This mechanism is particularly simple and easy to maintain in good working condition.

According to a further feature of the invention the strip feed rolls are controlled by a hand lever whereby the pass between them can be opened and closed, said hand lever being connected by mechanism with the above-mentioned pawl, whereby it can be disengaged by both the feeler and by the hand lever, and the shear ram can be engaged. This has the advantage that by means of the hand lever the shear mechanism can be actuated also at the beginning of a strip. Preferably means actuated by the punch ram are also provided for opening the feed roll pass, said means cooperating with the coupling mechanism in such a manner that when the hand lever is in engaged position, the pawl is disengaged from the pass opening levers.

The mechanism according to the invention may also comprise a bar jointed to the lever cooperating with the pawl, said bar being connected to the pawl by a link, and a heel on the shear ram, said bar on upward travel of the shear ram being carried along thereby and effecting disengagement of said ram.

Finally, the mechanism may comprise a stop arranged between the shear blades and the feed rolls and which can be projected into the path of strip feed before insertion of a fresh strip, a block carrying the upper feed roll and movable by means of the hand lever, means connecting said block with the stop and the feeler, said stop when the feed roll pass is open being in engaged position with the feeler inoperative, and when the pass is closed said stop being inoperative and the feeler in operative position.

The drawings illustrate by way of example a preferred construction of machine according to the invention. In these drawings:

Fig. 4 is a sectional view taken on line 1—1 of Fig. 3;

Fig. 5 is a sectional view taken on line 2—2 in Fig. 4, with the shear ram disengaged;

Figure 1:
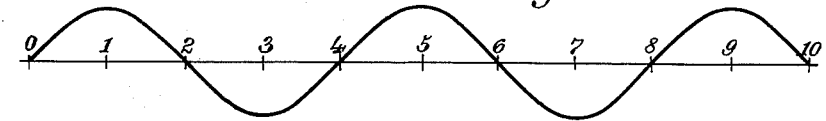
Figure 1 is a graph in which the abscissae denote the times of a plurality of strokes of the punch ram at the beginning of a strip while the ordinates show the corresponding ram positions.

The machine comprises a frame 11 in which are mounted for vertical reciprocation, a pair of blocks 14 and 15, carrying rotatably therein an upper feed roll 13. The two blocks are connected at their upper ends to a rectangular carrier 93 parallel to the axis of the roll. The corresponding lower feed roll 12 is mounted in the frame 11. By raising and lowering the bearing blocks 14 and 15 the feed roll pass can be opened and closed. On the front side of the frame 11 there is fulcrumed at 16 (see Fig. 7) a two-armed rock lever 18 and 18', and at the rear side a two-armed rock lever 19 and 62. These rock levers support at 20 and 21 the blocks 14 and 15, and they are also jointed at 22 and 23 to rods 80 and 81 fixed to the punch ram 24. The rock levers 18 and 18' and 19 and 62 oscillate in synchronism with the work cycle of the ram 24, whereby during each stroke thereof the feed roll pass is automatically opened and then closed.

A hand lever 25 for the lever 29 is pivoted in the frame at 70. By turning the hand lever 25 from the position designated A in Fig. 3 into the position designated B the upper feed roll 13 is raised by direct contact of the outer end of the lever 25 hitting the feed roll. The hand lever 25 is also coupled to a lever 69, for example, by means of two cooperating projections, such that the lever 25 will drive the lever 69 only in its shift from position A to position C. The lever 69 is connected through a push rod 71 and the link 29 with a lever 32 fixed on shaft 31. The lever 29 has a notch 72 adapted to engage a lug 30 on the rock lever 18 and 18'. The lever 32 engages a bolt 73 slidably mounted in the machine frame 11 which bolt carries a locking member 28 acted upon by a compression spring 26 which abuts against the frame 11, said locking member having a notch 74 cooperating with a projection 27 which is secured to the carrier 93 approximately in the middle between the blocks 14 and 15. The spring 26 urges the locking member 28 to the left in Figure 5.

The feed rolls 12 and 13 are driven stepwise by a crank disc 85 and an adjustable crank 86 of the crank disc 85 has one end of a crank rod 87 connected thereto. The other end of the rod 87 is connected to one end of a link 88, the latter being secured on a shaft 89. The shaft 89 is mounted in a carrier drive 90 so that the rotation of the shaft 89 is only in one direction to the gears 91 and 92. The gears 91 and 92 are mounted on the axles of the rolls 12 and 13 respectively. The drive for the crank disc 85 is so provided that the rolls 12 and 13 are driven when the roll 13 is in its lowered position.

Figure 6:
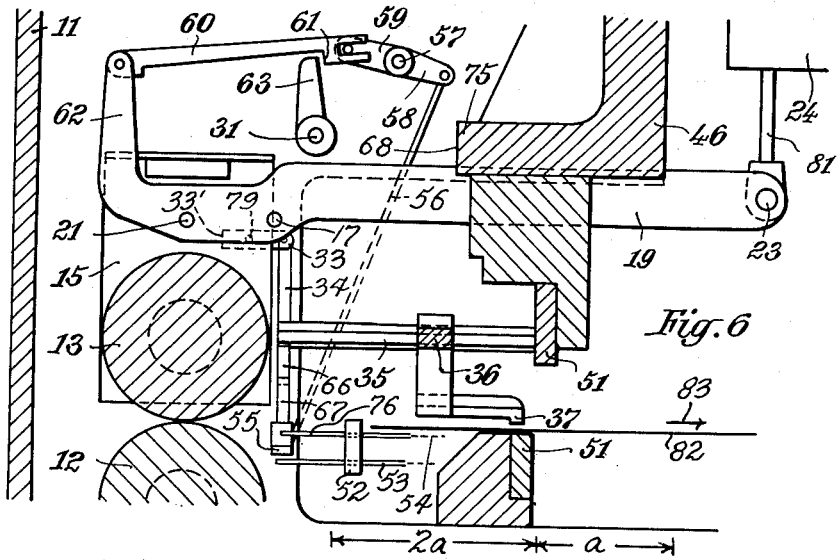
Fig. 6 is a sectional view taken on line 3—3 of Fig. 4.

A pawl 38 fixed on the shaft 31 holds in the locking position shown in Fig. 5, one arm 40 of a three-armed lever 40, 41, 42 pivoted at 39. A compression spring 43 bearing on the frame 11 and acting on the arm 41 of said lever, urges the lever 40, 41, 42 to turn in clockwise direction. The arm 41 has pivoted thereto a thrust rod 44 connected to a coupling bolt 45 slidably mounted in the shear ram 46. The shear ram 46 is arranged to slide vertically in the frame 11 and it carries the upper one of the two shear blades 51, the lower one of which is fixed in the frame 11. The punch ram 24 carries a molding 48 having a notch 47 therein fitting the coupling bolt 45. The arm 42 of the three-armed lever 40, 41, 42 has a bar 49 pivoted thereto and a link 50 is jointedly connected to said bar 49 and the pawl 38. The bar 49, to disengage the shear ram 46 by actuation of the bolt 45 during its upward movement, is raised by a heel 75 on the ram 46, see Fig. 5. On the arm 62 of the lever 19, 62 (see Fig. 6) is jointed a rod 60 which has a forked end loosely engaging a lever 59 fixed on the shaft 57. The rod 60 has a lug 61 cooperating with an arm 63 (Fig. 6) on the shaft 31. On the shaft 57 is mounted a second arm 58 having a push rod 56 (see Fig. 4) jointed thereto, which rod is attached to an arm 55 of a three-armed lever 55, 67 and 76. A tension spring 65 one end of which is attached to the frame 11 has its other end connected to the arm 55 and tends to rock the three-armed lever 55, 67, 76 clockwise. The arm 76 of this lever is extended to a ledge which grips in a cut out portion at the rear end on slidable feelers 52 on the shaft 53. The arm 67 operates with an arm 66 of a two-armed lever 35, 66 pivoted at 77. The said arm 35 is also connected by a push rod 34 to an arm 33 of a two-armed lever 33 and 33' pivoted at 79, the other arm 33' thereof extending into a recess in the block 15.

Figure 3:
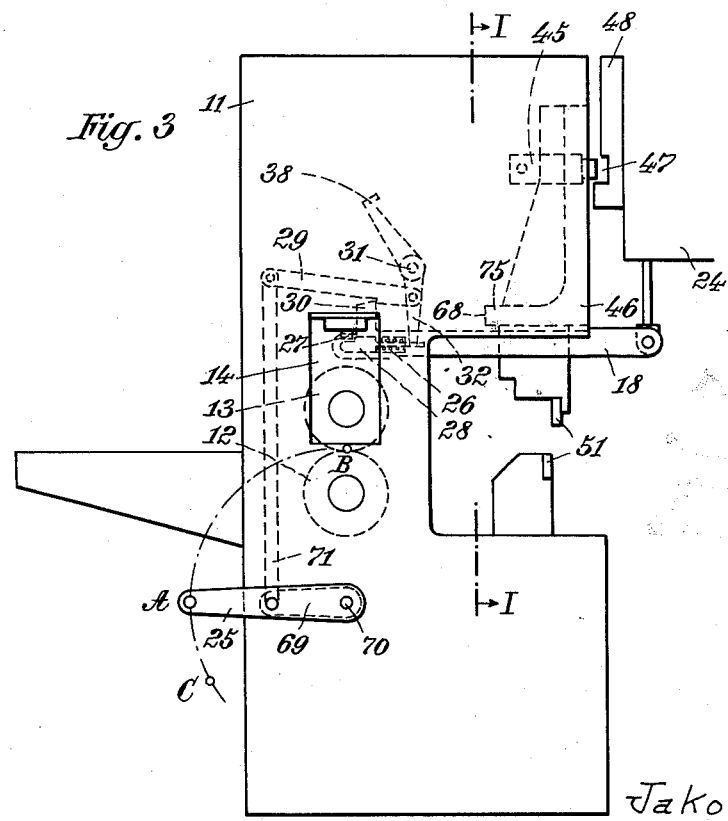
Fig. 3 is a front elevation of a shear mechanism according to the invention.
Figure 9:
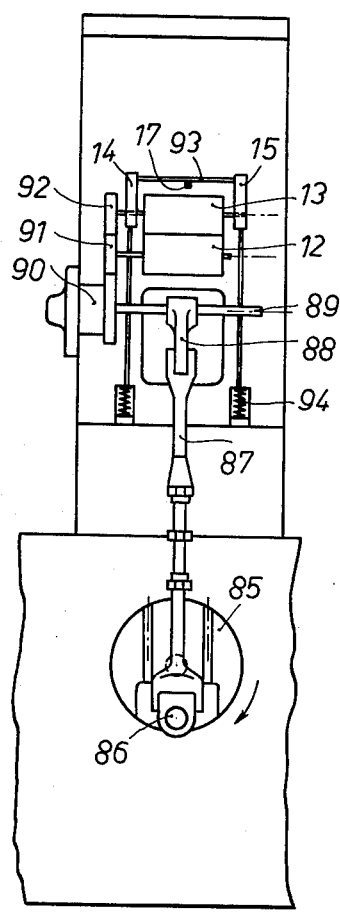

The operation of the mechanism is as follows:

To feed in a new band of strip material, the feed roll pass is opened by turning the single hand lever 25 from the position designated A in Fig. 3 into position B to lift both blocks 14 and 15. By this action the lever 33 and 33' and the lever 35, 66 turn in clockwise direction, and the lever 55, 67 and 76 in counterclockwise direction, whereby the parts arrive in the position shown in Fig. 4, in which the stop 37 is projected into the path of feed, while the feeler 52 is withdrawn and inoperative. In the uppermost position of the roll 13 shown in Fig. 5, the locking member 28 is shifted into locking position under action of the spring 26, holding the blocks 14 and 15. The hand lever 25 is now restored to position A. A new band of strip material is then inserted for instance by hand up to the stop 37 and the hand lever 25 is then rocked to position C, Fig. 3, in which movement it carries down the lever 69. Thereby, the rod 29 is moved out of the oblique position shown in Fig. 5 into the horizontal position shown in Fig. 7 in which it cooperates with the lock 30 of the rock lever 18 and 18'. During the movement of the punch ram in the interval 1-3 (Fig. 1) the lever 18 and 18' turns clockwise. By means of the lock 30 and the rod 29, the lever 32 is rocked in counterclockwise direction, and at the same time the bolt 73 is brought into the open position shown in Fig. 7. At the lower dead point of the punch ram 24, at instant 3, the main drive having been started, the blocks 14 and 15 are disengaged. The roll 13 under the action of springs 94 (see Figure 9) and its own weight and that of the blocks 14 and 15, returns to the closed position shown in Fig. 6. In this downward movement it raises the stop 37 again out of the path of feed and the feeler 52 assumes its operative position, in which it presses against the work strip under the action of the spring 65. Between the arms 66 and 67 of the lever 35 and 36 and the lever 55, 67 and 76 a space is now present.

Figure 7:
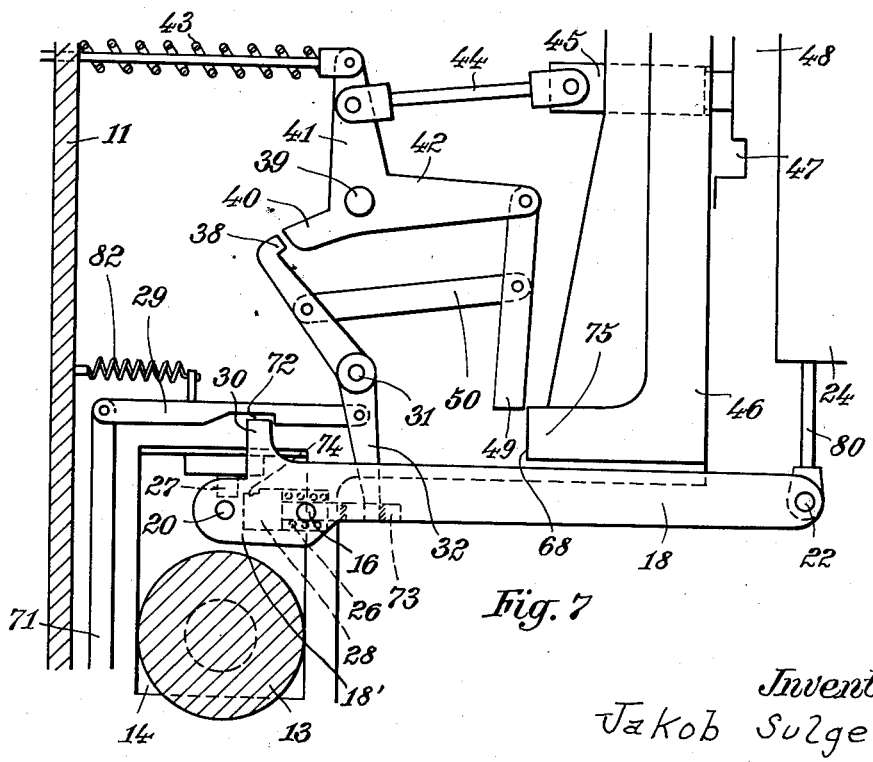
Fig. 7 is a sectional view taken on line 2—2 of Fig. 4, showing the mechanism prepared for engagement.
Figure 8:
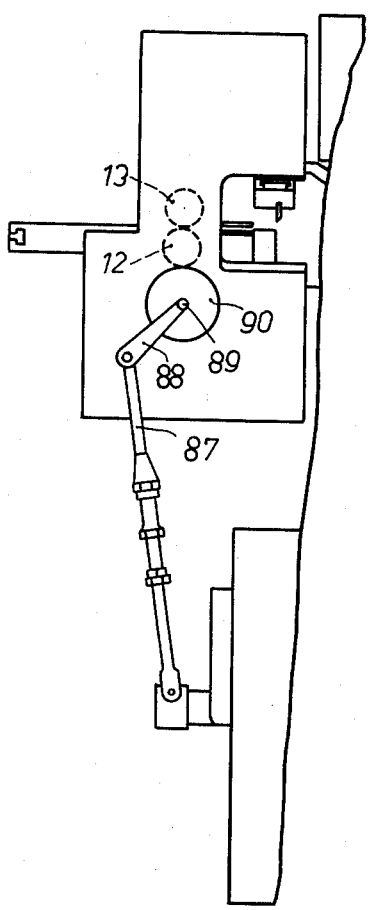
Figs. 8 and 9 are side and end elevations respectively showing the stepwise feed by means of a crank rod mechanism.

By rocking the lever 32, during the interval 2-3, the locking pawls 40 and 38 move out of the locking position shown in Fig. 5 and come into the inoperative position of Fig. 7, in which the spring 43 acts on the lever 40, 41 and 42, and turns the same clockwise to such an extent that the coupling bolt 45 bears against moulding 48 fixed to a ram 24, Fig. 7, in the non-operative position shown in Fig. 7 in which it is not actuated by the upwardly moving ram 24 in the interval 3-5. Between the pawl 38 and the arm 40 of the lever 40, 41 and 42, there is now a separation. During the rise of the tool ram 24 in the interval from 3-5, and shortly after the instant 3, the heel 75 is lifted above the lower end of the bar 49. The lever 18 and 18' turns counterclockwise, the bar 29 under the action of spring 82 follows the lever until the bar 49 is caused by members 32, 38 and 50, to bear against the edge 68 of the heel 75. The hand lever, at about the instant 4, is moved out of its lower position C into position A. Consequently, the rod 29 under the action of a spring, not shown, moves out of the horizontal position of Fig. 7 back into the oblique position shown in Fig. 5, in which it can no longer be engaged by the lock 30 of the lever 18 and 18'. In the interval from 4-6, while the crank shaft driving the punch ram 24 traverses the upper half of its circular path, the band for the first time is advanced by one step, whereby its front end arrives under the shear 51. At the instant 5, in which the punch ram 46 is at its upper dead point, the coupling bolt 45 under the action of spring 43 enters the notch 47, and at the same time the lever 40, 41 and 42 turns further in clockwise direction.

In the ensuing operation of the punch ram 24 in the interval from 5-7, the shear ram 46 is carried along. Briefly, before the lowermost point of travel of the ram 46, that is just before the instant 7, the shear blades cut the beginning of the strip. During the downward movement of the shear ram 46 the bar 49, as soon as the heel 75 lies lower than the lower end of the bar, rocks over the heel 75 to such an extent that the pawl 38 bears against the arm 40 of the lever 40, 41 and 42. In the interval from 7-9, the punch ram 24 and the shear ram 46 again move upwardly. The heel 75 raises the bar 49 which rocks the lever 40, 41 and 42 counterclockwise; the coupling bolt 45 is thereby retracted, the parts 40, 38 arrive in the locked position of Fig. 5 in which they remain while the strip is being punched.

Figure 2:
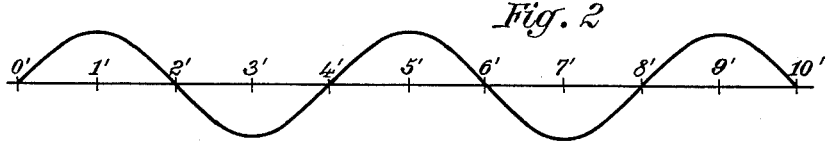
Fig. 2 is a corresponding graph for the end of the strip.

If, at the end of a strip 82 there is to be performed on the length in front of the shear mechanism a further stamping operation, and a fraction of a stamping operation, the feeler 52 arrives somewhere between the intervals 0'-2', see Fig. 2, during the penultimate feed stroke under the action of the spring 65, from the inoperative position shown in Fig. 4 to the engaging position. The distance the work piece 82 moves in the direction of the arrow 83, is indicated by the distance $a$ in Figure 6. During this action, the levers 55, 67 and 76 rock in clockwise direction until its arm 67 bears against the arm 66 of the levers 35 and 36. In the rocking of the feeler 52, see Fig. 4, the shaft 57 is turned counterclockwise by means of the push rod 56 and the lever 58 (see Figure 6), so that the socket end of the rod 60 arrives in the lower position shown in Fig. 6 in which the rod 60 can cooperate with the arm 63. In the following rise of the punch ram 24 in the interval from 3'-5', the rod 60 is moved to the left by means of the lever 19 and 62, see Fig. 6, whereby the arm 63 and the shaft 31 turn counter-clockwise. The rocking pawl 38 and the bar 49 return to the position shown in Fig. 7 so that the coupling bolt bears against the molding 48 on the punch ram 24. During the last feed step, in the interval from 4'–6', the shear ram 46 is engaged at the upper dead point position of the punch ram 24, at the instant 5'. In the now following downward movement of both rams, the shears cut the strip at its end. The cut off piece is shorter than one stamping. This cut is effected shortly before the lower dead point position of the ram, that is before the instant 7'. The locking pawl and the bar 49 again effect the movement described in connection with coupling the beginning of the stroke. Then during the ensuing upward movement of the punch 24 in the interval from 7'–9' the shear ram 46 is again disengaged. The locking pawl 38 again locks the mechanism.

Finally, on turning the hand lever 25 from A to B the feed roll pass is opened whereupon the levers 35 and 36 turn clockwise and the levers 55, 67 and 76 counter-clockwise. By means of the levers 58 and 59 the forked end of the rod 60 is raised upwardly from the position shown in Fig. 6 so that the rod 60 can no longer co-operate with the arm 63. On opening the feed roll pass, the stop 37 and the feeler 52 simultaneously arrive in the position shown in Fig. 4, in which the stop is in operative position and the feeler in non-operative position. The mechanism is then ready to feed in a further strip.

It is, of course, understood that the machines and mechanism described in the foregoing are capable of various modifications within the scope of the appended claims.

I claim as my invention:

1. A means for cutting and punching a strip of material comprising a feed device consisting of a pair of rollers, means operating said rollers feeding the strip of material into complete operating position, a vertically movable punching means including a ram having a recess therein, a cutting device disposed in advance of said punching means, said cutting device having a pair of cutters disposed one above the other, a feeling means arranged in the path of the strip of material and in operative connection with the cutting device and responsive to passage of the trailing end of said strip for initiating an end cutting operation after completion of the operation of the punching means, the cutting device including a vertically movable ram carrying the upper cutter and operated to guide said cutter in a vertical path, a slidable bolt mounted in said cutting ram, and a spring urging said bolt into said recess to raise said cutting ram during elevation of said punching ram.

2. A means for cutting and punching according to claim 1, wherein said feeling means is located in advance of said cutting device and including an arm engageable with the strip and in which there is a latch-linkage connection between the feeling means arm and said bolt to restrain said spring from urging said bolt into said recess and releasable when the feeling means moves into the feed path upon passage of the trailing end of the band.

3. A means for cutting and punching according to claim 2, wherein said latch-linkage connection comprises a rotatable three-arm lever having one arm connected to said bolt, and a catch cooperating with a second arm releasing said bolt.

4. A means for cutting and punching according to claim 3, wherein said feed device includes a pair of movable bearing blocks for one feed roller, a manually operated lever engaging said blocks moving said one roller away from the other roller, connections between said lever and said catch, releasing said catch upon operation of said lever.

5. A means for cutting and punching according to claim 4, in which a leg is pivoted to the third arm of said three-arm lever and said cutting ram is provided with a ledge engaged by said pivoted leg rotating said three-armed lever withdrawing said bolt upon upward movement of said cutting ram.

6. A means for cutting and punching according to claim 5, including a link connecting said pivoted leg and said catch whereby the catch is released on upward movement of said leg.

7. A machine for cutting and punching a strip of material comprising a feed device consisting of a pair of rollers, means operating said rollers feeding the strip of material into complete operating position, a punching means, a cutting device in advance of said punching means, and a feeling means arranged in the path of the strip in advance of said cutting device and in operative connection therewith and responsive to passage of the trailing end of said strip for initiating an end cutting operation after completion of the operations of the punching means.

8. The machine of claim 7, together with stop means including a pivotally mounted lever having an arm projectable into the path of the strip of material, a pair of movable bearing blocks, one feed roller being journaled in said blocks, means moving the bearing blocks separating the feed rollers and interrupting the feed of said strip, connections between the stop means, the feeling means and the bearing blocks whereby elevation of the one feed roller places the stop means in operating position and lowering of the one feed roller moves the feeler into operating position.

References Cited in the file of this patent

UNITED STATES PATENTS

| | | |
|---|---|---|
| 915,020 | Daniels | Mar. 9, 1909 |
| 1,289,522 | Newson | Dec. 31, 1918 |
| 1,402,848 | Dutro | Jan. 10, 1922 |
| 1,900,252 | Morgan | Mar. 7, 1933 |
| 2,070,537 | Matthews | Feb. 9, 1937 |
| 2,452,402 | Stringe | Oct. 26, 1948 |